(12) United States Patent
Yilmaz et al.

(10) Patent No.: US 10,666,890 B2
(45) Date of Patent: May 26, 2020

(54) APPARATUS, METHOD AND COMPUTER PROGRAM FOR OBTAINING A DISPLAY AT POWER-ON

(71) Applicant: Vestel Elektronik Sanayi ve Ticaret A.S., Manisa (TR)

(72) Inventors: Evren Gökhan Yilmaz, Manisa (TR); Güner Öztekin, Manisa (TR)

(73) Assignee: VESTEL ELEKTRONIK SANAYI VE TICARET A.S. (TR)

( * ) Notice: Subject to any disclaimer, the term of this patent is extended or adjusted under 35 U.S.C. 154(b) by 0 days.

(21) Appl. No.: 16/444,460

(22) Filed: Jun. 18, 2019

(65) Prior Publication Data

US 2019/0394418 A1 Dec. 26, 2019

(30) Foreign Application Priority Data

Jun. 26, 2018 (EP) .................................... 18179864

(51) Int. Cl.
  *H04N 5/38* (2006.01)
  *H04N 5/268* (2006.01)
  *H04N 5/63* (2006.01)
(52) U.S. Cl.
  CPC ............... *H04N 5/38* (2013.01); *H04N 5/268* (2013.01); *H04N 5/63* (2013.01)
(58) Field of Classification Search
  CPC ............ H04N 5/38; H04N 5/268; H04N 5/63; H04N 5/44; H04N 5/50
  USPC .......................... 348/723, 725, 731, 553, 554
  See application file for complete search history.

(56) References Cited

U.S. PATENT DOCUMENTS

| | | | | |
|---|---|---|---|---|
| 5,311,317 A * | 5/1994 | Ogura | ................. | H04N 5/4448 348/725 |
| 6,064,449 A * | 5/2000 | White | .................... | H04N 5/445 348/554 |
| 6,587,154 B1 * | 7/2003 | Anderson | .......... | H04N 5/44513 348/553 |
| 6,593,973 B1 * | 7/2003 | Sullivan | ............... | H04N 5/4401 348/584 |

FOREIGN PATENT DOCUMENTS

| | | |
|---|---|---|
| EP | 1852731 A1 | 11/2007 |
| EP | 2746935 A1 | 6/2014 |

* cited by examiner

*Primary Examiner* — Trang U Tran
(74) *Attorney, Agent, or Firm* — Shaukat A. Karjeker; Carstens & Cahoon, LLP

(57) ABSTRACT

A video signal processing apparatus (202) for transmitting a video signal when the apparatus (202) is powered on. The video signal is one of a first video signal (CLK1, DATA1) and a second video signal (CLK2, DATA2). The first video signal comprises a first video clock (CLK1) and first video data (DATA1), and the second video signal comprises a second video clock (CLK2) and second video data (DATA2). The apparatus (202) is arranged to detect at an input of the apparatus (202) a presence or an absence of the first video signal, transmit the first video signal to an output of the apparatus (202) when the first video signal is detected, and transmit the second video signal to the output of the apparatus (202) when the first video signal is not detected, the second video signal being already stored in a memory (204) of the apparatus (202).

7 Claims, 2 Drawing Sheets

APPARATUS, METHOD AND COMPUTER PROGRAM FOR OBTAINING A DISPLAY AT POWER-ON

CROSS-REFERENCE TO RELATED APPLICATIONS

This application claims the benefit under 35 U.S.C. 119(a) and 37 CFR § 1.55 to European patent application 18179864.6 filed Jun. 26, 2018, the entire content of which is incorporated herein by reference.

TECHNICAL FIELD

The present disclosure relates to display devices and, in particular but without limitation, to an apparatus, method and computer program for obtaining a fast display at power-on.

BACKGROUND

As depicted in FIG. 1, a conventional display system 100 may schematically comprise a video source 101 and a display unit 103 (also sometimes referred to as a "panel"). When the display system 100 powers up by providing electrical power simultaneously to the video source 101 and the display unit 103, a boot process (also referred to as a "starting up process" or an "initialization process") occurs until a screen of the display unit 103 starts to display a video image upon receiving a video signal comprising a video clock (CLK) and video data (DATA) from the video source 101. The boot process may take some time varying according to the design of the display system 100. For example, it may have a duration ranging from a few seconds (e.g., of the order of 3-4 seconds) to 30-40 seconds.

To notify a user that the boot process is in progress and to capture and sustain the user's attention, a dedicated logo or splash screen (e.g., a still image or a control element in a graphical user interface such as a button or a scroll bar, etc.) can be displayed on the screen of the display unit 103 during the boot process.

Although the boot process of the display unit 103 is usually completed earlier than that of the video source 101, the logo or splash screen cannot however be displayed instantaneously as a conventional display system 100 still takes time to provide a logo or splash screen for display, so that there happens a blank or black screen at the display unit 103 for a few seconds after power-on.

SUMMARY

According to a first aspect disclosed herein, there may be provided a video signal processing apparatus for transmitting a video signal when the apparatus is powered on. The video signal may be one of a first video signal and a second video signal. The first video signal may comprise a first video clock and first video data, and the second video signal comprises a second video clock and second video data. The apparatus may be arranged to detect at an input of the apparatus a presence or an absence of the first video signal, transmit the first video signal to an output of the apparatus when the presence of the first video signal is detected, and transmit the second video signal to the output of the apparatus when the absence of the first video signal is detected, the second video signal being already stored in a memory of the apparatus.

Thereby, a video signal can be transmitted to the output of the apparatus at any time when the apparatus is powered on. In particular, the second video signal can thereby be immediately transmitted to the output of the apparatus at power-on.

In an example of the first aspect, the memory may be preloaded with the second video signal.

Thereby, the second video signal can be immediately available at each power-on, even at the first power-on.

In an example of the first aspect, the apparatus may be arranged to store the second video signal in the memory of the apparatus when the apparatus is previously powered on.

Thereby, the second video signal can be available at a power-on subsequent/next to the first power-on.

In an example of the first aspect, the apparatus may be arranged, when the apparatus is previously powered on, to detect at the input of the apparatus a presence of a third video signal comprising a third video clock and third video data, the third video data comprising at least one data frame, transmit the third video signal to the output of the apparatus when the presence of the third video signal is detected, change the third video signal into the second video signal during a predefined time period by changing at least the third video clock into the second video clock during the predefined time period, transmit the second video signal to the memory of the apparatus for storing the second video signal, change the second video signal into the third video signal at a completion of the predefined time period, and transmit the third video signal to the output of the apparatus.

Thereby, any specific second video signal can be stored in the memory. Depending on a number of occurrences of the video clock change during said second time period and depending on said predefined time period, one or more second video signal(s) providing each one or more images can be stored in the memory such that multiple images can be stored in the memory, each image being represented by a single data frame.

In an example of the first aspect, the memory of the apparatus may be non-volatile.

Thereby, the video signal in the memory can remain stored at each next power-on/start-up of the apparatus.

In an example of the first aspect, the first and second video data may comprise at least one data frame.

As each data frame of a video represents a respective image, one or more images can thereby be stored in the memory. By the way, the memory can be accordingly dimensioned to be adapted to the number and size of images or video data frames to be stored.

In an example of the first aspect, the second video signal may comprise a repeater and be arranged such that the second video signal is transmitted to the output of the apparatus through the repeater, wherein the repeater may be arranged to capture the second video signal from the memory and repeat in a sequence the second video signal to the output of the apparatus.

Thereby, the apparatus can enter a self-refresh mode to repeatedly transmit in a sequence the second video signal to its output via the repeater.

According to a second aspect disclosed herein, there may be provided a method of transmitting a video signal when a video signal processing apparatus is powered on. The video signal may be one of a first video signal and a second video signal. The first video signal may comprise a first video clock and first video data, and the second video signal may comprise a second video clock and second video data. The method may be performed by the apparatus and comprise the step of detecting at an input of the apparatus a presence or an absence of the first video signal, the step of transmitting the first video signal to an output of the apparatus when the presence of the first video signal is detected, and the step of transmitting the second video signal to the output of the apparatus when the absence of the first video signal is detected, the second video signal being already stored in a memory of the apparatus.

In an example of the second aspect, the method may comprise the step of storing the second video signal in the memory of the apparatus when the apparatus is previously powered on.

In an example of the second aspect, when the apparatus is previously powered on, the method may comprise the step of detecting at the input of the apparatus a presence of a third video signal comprising a third video clock and third video data, the third video data comprising at least one data frame, the step of transmitting the third video signal to the output of the apparatus when the presence of the third video signal is detected, the step of changing the third video signal into the second video signal during a predefined time period by changing at least the third video clock into the second video clock during the predefined time period, the step of transmitting the second video signal to the memory of the apparatus for storing the second video signal, the step of changing the second video signal into the third video signal at a completion of the predefined time period, and the step of transmitting the third video signal to the output of the apparatus.

In an example of the second aspect, the step of transmitting the second video signal to the output of the apparatus may comprise capturing the second video signal from the memory and repeating in a sequence the second video signal to the output of the apparatus.

According to a third aspect disclosed herein, there may be provided a computer program product comprising program instructions such that, when the computer program is executed on a device, the computing device is arranged to carry out a method according to any one of the second aspect and examples of the second aspect.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
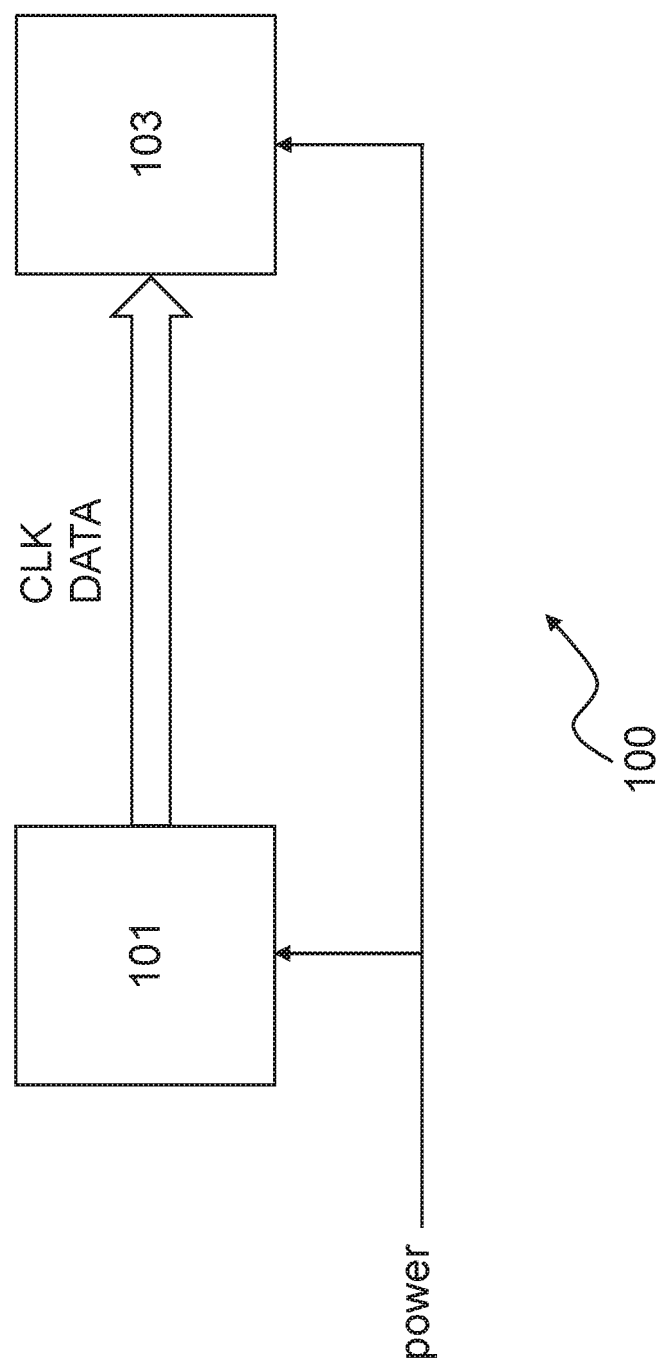
FIG. 1 shows schematically a conventional display system.
Figure 2:
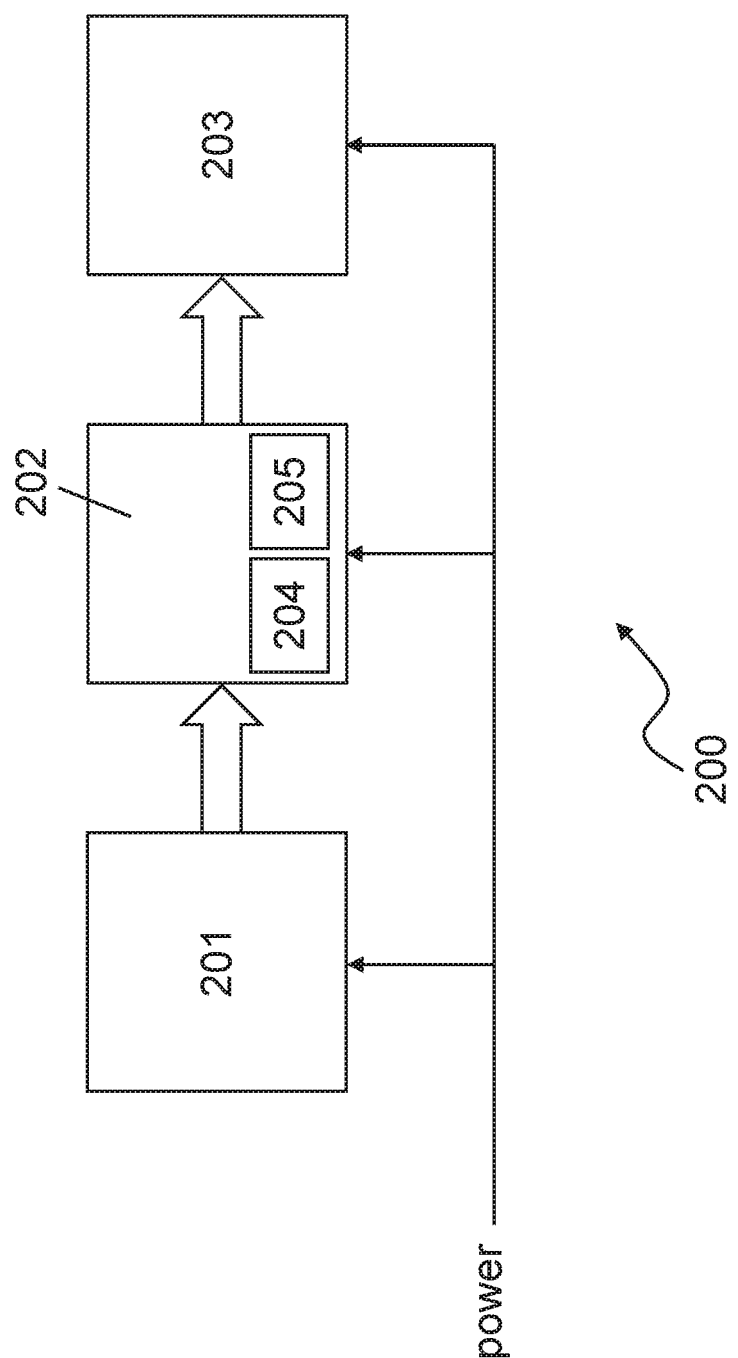
FIG. 2 shows schematically an example of a display system according to the present disclosure.

FIG. 2 shows schematically an example of a display system 200 according to the present disclosure.

As illustrated in FIG. 2, the display system 200 may comprise a video source 201, a video signal processing apparatus 202 and a display unit 203 (also sometimes referred to as a "panel"). Within the display system 200, the video source 201, the video signal processing apparatus 202 and the display unit 203 may be either separate entities or a single entity. The display system 200 may be any suitable display device such as any computing and consumer electronic device (e.g., a smart liquid crystal display (LCD)/light emitting diode (LED)/organic LED (OLED)/plasma TV set, a laptop computer, etc.). The display system 200 is powered on in such a manner that the video source 201, the video signal processing apparatus 202 and the display unit 203 are powered on at the same time. When the display system 200 powers up by providing electrical power simultaneously to the video source 201, the video signal processing apparatus 202 and the display unit 203, a boot process (also referred to as a "starting up process" or an "initialization process") occurs until a screen of the display unit 203 starts to display a video signal.

The video source 201 may be, for example, a graphic processor unit (GPU) or a general processor (e.g., an accelerated processing unit (APU) or any other suitable processor).

The video source 201 may be arranged, during a time duration corresponding to its boot process, to be generating a video signal (CLK, DATA) comprising a video clock (CLK) and video data (DATA) and, once its boot process has been completed, to transmit the generated video signal (CLK, DATA) to an input of the video signal processing apparatus 202 through a wired or wireless communication link or line.

The video signal processing apparatus 202 may be simply designed to have a time duration of its boot process shorter than that of the video source 201. The video signal processing apparatus 202 may comprise at least a non-volatile memory 204 (or storage 204) and a repeater 205. The non-volatile memory 204 may include, for example, a read-only memory (ROM), a programmable ROM (PROM), an erasable PROM (EPROM), an electrically erasable PROM (EEPROM), a disk drive, a floppy disk, a compact disc ROM (CD-ROM), a digital versatile disk (DVD), a flash memory (e.g., a floating gate memory, a charge trapping memory, a magneto-resistive random access memory (MRAM) or a phase change RAM (PCRAM)) and so on.

The video signal processing apparatus 202 may be arranged to scan and detect at its input a presence or an absence of a video signal (CLK1, DATA1) from the video source 201. During a normal operation mode starting from the completion of the boot process of the video source 201, if the video signal processing apparatus 202 detects at its input the presence of the video signal (CLK1, DATA1) from the video source 201, then the video signal processing apparatus 202 may transmit the detected video signal (CLK1, DATA1) to its output. At an earlier stage, namely during the boot process of the video source 201, no video signal (CLK1, DATA1) has yet been sent from the video source 201 so that the video signal processing apparatus 202 detects at its input the absence of the video signal (CLK1, DATA1) from the video source 201. During this earlier stage, namely during the boot process of the video source 201, the video signal processing apparatus 202 may then be arranged to transmit a video signal (CLK2, DATA2) already stored in the non-volatile memory 204 to its output. To do so, the repeater 205 may be arranged to capture the already stored video signal (CLK2, DATA2) from the memory 204 and repeat it in a sequence as a self-refresh mode to its output until the video signal processing apparatus 202 detects at its input the presence of the video signal (CLK1, DATA1) from the video source 201. It shall be noted that the feature of non-volatility allows the video signal (CLK2, DATA2) to remain stored in the memory 204 at each next power-on/start-up of the video signal processing apparatus 202. Thereby, the stored video signal (CLK2, DATA2) is still available when the video signal processing apparatus 202 powers on again, and the repeater 205 can then capture it practically immediately and repeat it in sequence as a self-refresh mode to the output of the video signal processing apparatus 202. As an example to illustrate this, the stored video signal (CLK2, DATA2) can be read from the non-volatile memory 204 and sent to the output of the video signal processing apparatus 202 for display within a few milliseconds of power-on/boot up. This compares with the typical time of a few seconds (e.g. of the order of 3-4 seconds) to 30-40 seconds or so that is required for a power-on/boot process to complete, during which a conventional display system 100 is not providing a logo or splash screen or the like for display, as discussed in the introduction above.

In an option, the non-volatile memory 204 may be preloaded with a video signal (CLK2, DATA2) as the already stored video signal (CLK2, DATA2). In this way, the already stored video signal (CLK2, DATA2) can be immediately available at each power-on of the video source 201, in particular even at the first power-on of the video source 201. The video signal (CLK2, DATA2) may, for example, be preloaded by a manufacturer of the video signal processing apparatus 202 at the time of manufacture.

Alternatively or additionally, the video signal processing apparatus 202 may be arranged to store a video signal (CLK2, DATA2) at a previous power-on. Thus, when no video signal (CLK2, DATA2) has not yet been stored in the non-volatile memory 204, the video signal processing apparatus 202 may be arranged to scan and detect at its input a presence of a video signal (CLK3, DATA3) from the video source 201. During a normal operation mode starting from the completion of the boot process of the video source 201, if the video signal processing apparatus 202 detects at its input the presence of a video signal (CLK3, DATA3) from the video source 201, then the video signal processing apparatus 202 may transmit the detected video signal (CLK3, DATA3) to its output. At any time, the video source 201 may decide to store an image as the video signal (CLK2, DATA2) into the non-volatile memory 204. Thus, during a predefined time period, the video source 201 may be arranged to change the detected video signal (CLK3, DATA3) into the video signal (CLK2, DATA2) to be stored by changing the video clock from CLK3 to CLK2 and, accordingly, the video data from DATA3 to DATA2, and arranged to transmit the video signal (CLK2, DATA2) to the non-volatile memory 204. Thereby, the transmission of the video signal (CLK3, DATA3) is interrupted between the input and the output of the video signal processing apparatus 202 during this predefined time period. As one data frame of a video may represent one image, the predefined time period may be determined so as to obtain one or more data frames according to whether one or more images as decided by the video source 201 are to be stored in the non-volatile memory 204. Thus, in an example, the duration of the predefined time period shall be such that the full data of each data frame can be entirely captured. At a completion of the predefined time period, namely once the change has been achieved and the video signal (CLK2, DATA2) has been stored into the non-volatile memory 204, the video source 201 may be arranged to resume transmission of the video signal (CLK3, DATA3) to the video signal processing apparatus 202 by changing the video signal (CLK2, DATA2) into the video signal (CLK3, DATA3), and in turn, the video signal processing apparatus 202 may again transmit the video signal (CLK3, DATA3) from its input to its output. Thus, when the display system 200 is powered off and subsequently powered on, the video signal processing apparatus 202 will detect no video signal at its input during the boot process of the video source 201 and will be then arranged to transmit, via the repeater 205, the video signal (CLK2, DATA2) as stored during the previous power-on to its output. The video signals (CLK1, DATA1) and (CLK3, DATA3), which are generated by the video source 201 during a different power-on, i.e., during a power-on for the video signal (CLK1, DATA1) and a previous power-on for the video signal (CLK3, DATA3), may be different from each other in an example and identical to each other in another example.

It shall be noted that the stored video signal may represent one or more images according to whether one or more data frames have been stored. If multiple images are stored, the repeater 205 may be arranged to capture them practically immediately and repeat them in a sequence as a self-refresh mode to the output of the video signal processing apparatus 202.

The display unit 203 may be, for example, a flat panel display such as a LCD, a field emission display (FED), a LED display, an OLED, a plasma display, an electrophoresis display and so on.

The display unit 203 may be designed simply and arranged to immediately receive from the output of the video signal processing apparatus 202 one of the video signals (CLK1, DATA1; CLK2, DATA2; CLK3, DATA3) through a wired or wireless communication link or line, and display it on its screen. Thus, as soon as the display system 200 is powered on by supplying power to the video source 201, the video signal processing apparatus 202 and the display unit 203 at the same time, a user will have the possibility to view an image (i.e., the already stored video signal (CLK2, DATA2) transmitted in a sequence by the repeater 205) displayed on the screen of the display unit 203 instantly, i.e., before the video source 201 has ended its boot up. The image may be, for example, a dedicated logo or a splash screen (e.g., a still image or a control element in a graphical user interface such as a button or a scroll bar, etc.), which will immediately notify the user that the boot process of the display system 200, in particular the boot process of the video source 201, is in progress, thereby capturing and sustaining his attention.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs) and so on. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium such as a solid-state drive (SSD) or other semiconductor-based read access memory (RAM), a read only memory (ROM) such as a compact disc (CD) ROM or a semiconductor ROM, a magnetic recording medium such as a floppy disk or a hard disk, optical memory devices in general and so on.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A video signal processing apparatus for transmitting a video signal when the apparatus is powered on,
   wherein the video signal is one of a first video signal and a second video signal, the first video signal comprising a first video clock and first video data, and the second video signal comprising a second video clock (CLK2) and second video data,
   the apparatus having a memory and configured to:
      detect at an input of the apparatus a presence or an absence of the first video signal;
      transmit the first video signal to an output of the apparatus when the presence of the first video signal is detected; and
      transmit the second video signal to the output of the apparatus when the absence of the first video signal is detected, the second video signal being already stored in the memory of the apparatus;
   wherein the apparatus is configured to:
      store the second video signal in the memory of the apparatus when the apparatus is previously powered on;
   wherein the apparatus is configured such that when the apparatus is previously powered on, the apparatus is configured to:
      detect at the input of the apparatus a presence of a third video signal comprising a third video clock and third video data, the third video data comprising at least one data frame;
      transmit the third video signal to the output of the apparatus when the presence of the third video signal is detected;
      change the third video signal into the second video signal during a predefined time period by changing at least the third video clock into the second video clock during the predefined time period;
      transmit the second video signal to the memory of the apparatus for storing the second video signal;
      change the second video signal into the third video signal at a completion of the predefined time period; and
      transmit the third video signal to the output of the apparatus.

2. The apparatus of claim 1, wherein the memory is preloaded with the second video signal.

3. The apparatus of claim 1, wherein the memory of the apparatus is non-volatile.

4. The apparatus of claim 1, wherein the first and second video data comprise at least one data frame.

5. The apparatus of claim 4 comprising a repeater and configured such that the second video signal is transmitted to the output of the apparatus through the repeater, the repeater configured to capture the second video signal from the memory and repeat in a sequence the second video signal to the output of the apparatus.

6. A method of transmitting a video signal when a video signal processing apparatus having a memory is powered on,
   wherein the video signal is one of a first video signal and a second video signal, the first video signal comprising a first video clock and first video data, and the second video signal comprising a second video clock and second video data,
   the method being performed by the apparatus and comprising:
      detecting at an input of the apparatus a presence or an absence of the first video signal;
      transmitting the first video signal to an output of the apparatus when the presence of the first video signal is detected; and
      transmitting the second video signal to the output of the apparatus when the absence of the first video signal is detected, the second video signal being already stored in the memory of the apparatus;
   the method comprising:
      storing the second video signal in the memory of the apparatus when the apparatus is previously powered on; and
   when the apparatus is previously powered on:
      detecting at the input of the apparatus a presence of a third video signal comprising a third video clock and third video data, the third video data comprising at least one data frame;
      transmitting the third video signal to the output of the apparatus when the presence of the third video signal is detected;
      changing the third video signal into the second video signal during a predefined time period by changing at least the third video clock into the second video clock during the predefined time period;
      transmitting the second video signal to the memory of the apparatus for storing the second video signal;
      changing the second video signal into the third video signal at a completion of the predefined time period; and
      transmitting the third video signal to the output of the apparatus.

7. The method of claim 6, wherein transmitting the second video signal to the output of the apparatus comprises capturing the second video signal from the memory and repeating in a sequence the second video signal to the output of the apparatus.

* * * * *